(12) United States Patent
Pedulla

(10) Patent No.: US 11,464,602 B2
(45) Date of Patent: Oct. 11, 2022

(54) DEVICE AND METHOD FOR CONTROLLING AN ENDODONTIC MOTOR

(71) Applicant: Eugenio Pedulla, Catania (IT)

(72) Inventor: Eugenio Pedulla, Catania (IT)

(*) Notice: Subject to any disclaimer, the term of this patent is extended or adjusted under 35 U.S.C. 154(b) by 165 days.

(21) Appl. No.: 16/496,038

(22) PCT Filed: Mar. 23, 2018

(86) PCT No.: PCT/EP2018/057405
§ 371 (c)(1),
(2) Date: Sep. 20, 2019

(87) PCT Pub. No.: WO2018/172507
PCT Pub. Date: Sep. 27, 2018

(65) Prior Publication Data
US 2020/0022779 A1     Jan. 23, 2020

(30) Foreign Application Priority Data
Mar. 23, 2017   (IT) .................. 102017000032045

(51) Int. Cl.
*H02P 29/00*       (2016.01)
*A61C 1/06*        (2006.01)
(Continued)

(52) U.S. Cl.
CPC .............. *A61C 1/06* (2013.01); *A61C 5/40* (2017.02); *H02P 1/04* (2013.01); *H02P 29/00* (2013.01); *H02P 29/20* (2016.02); *H02P 29/40* (2016.02)

(58) Field of Classification Search
CPC .......... H02P 29/00; H02P 29/20; H02P 29/40; H02P 1/04
See application file for complete search history.

(56) References Cited

U.S. PATENT DOCUMENTS 5,543,695 A * 8/1996 Culp .................... A61C 1/0015
                                                  318/432
5,689,159 A * 11/1997 Culp .................... A61C 1/0015
                                                  318/400.18
(Continued)

FOREIGN PATENT DOCUMENTS

DE    10 2007 011 725 A1   9/2008
EP       2 431 004 A1      3/2012
(Continued)

OTHER PUBLICATIONS

Roane et al., "The "Balanced Force" Concept for Instrumentation of Curved Canals", Journal of Endodontics, Lippincot Williams & Wilkins, Philadelphia, PA, vol. 11, No. 5, May 1, 1985, pp. 203-211.
(Continued)

*Primary Examiner* — Rina I Duda
(74) *Attorney, Agent, or Firm* — Finch & Maloney PLLC; Jay S. Franklin; Michael J. Bujold

(57) ABSTRACT

A method and a device for controlling an electric motor (9), in particular for moving an endodontic instrument. The device has a first sensor (8) and a control unit (2). The control unit (2) has a drive unit (4), a second sensor (6) and a processing unit (3). The processing unit (3) is configured to cause the endodontic instrument (7) to perform a sequence of movements (M1, M2). The sequence of movements (M1, M2) includes a continuous forward movement (M1) and at least one alternating movement (M2). The sequence may include an additional alternating movement (M3) and/or a reverse movement (M4). The number and order of movements to be performed in a sequence depends on a set of predefined threshold values reflecting the torque load applied to the instrument, as measured by one of the sensors.

13 Claims, 6 Drawing Sheets

(51) Int. Cl.
*H02P 29/20* (2016.01)
*H02P 29/40* (2016.01)
*A61C 5/40* (2017.01)
*H02P 1/04* (2006.01)

(56) References Cited

U.S. PATENT DOCUMENTS

| | | | | |
|---|---|---|---|---|
| 6,942,485 B1* | 9/2005 | Richard | ............... | A61C 1/185 433/118 |
| 8,714,978 B2* | 5/2014 | Borgschulte | ............ | A61C 5/42 433/224 |
| 9,077,276 B2* | 7/2015 | Okamoto | ............. | H02P 29/027 |
| 9,186,226 B2* | 11/2015 | Kunisada | .............. | A61C 1/003 |
| 2002/0064756 A1* | 5/2002 | Pagnini | ................ | A61C 1/003 433/102 |
| 2010/0161955 A1* | 6/2010 | Helfenbein | ......... | G05B 19/182 713/100 |
| 2013/0224677 A1 | 8/2013 | Yamashita et al. | | |
| 2015/0086937 A1* | 3/2015 | Katsuda | ................ | A61C 5/48 433/27 |
| 2015/0086941 A1* | 3/2015 | Katsuda | ................ | A61C 5/48 433/102 |
| 2015/0342702 A1* | 12/2015 | Borgschulte | ........... | A61C 5/40 433/27 |

FOREIGN PATENT DOCUMENTS

| | | |
|---|---|---|
| EP | 2 716 254 A1 | 4/2014 |
| EP | 2 851 035 A1 | 3/2015 |
| WO | 00/15138 A1 | 3/2000 |
| WO | 2010/109464 A2 | 9/2010 |

OTHER PUBLICATIONS

Italian Search Report Corresponding to 201700032045 dated Nov. 28, 2017.
International Search Report Corresponding to PCT/EP2018/057405 dated May 7, 2018.
Written Opinion Corresponding to PCT/EP2018/057405 dated May 7, 2018.

* cited by examiner

DEVICE AND METHOD FOR CONTROLLING AN ENDODONTIC MOTOR

The present invention concerns a device and a method for controlling an electric motor for moving an endodontic instrument.

The present invention also concerns an electric motor that is designed to move an endodontic instrument.

There exist commercially available endodontic devices that mainly comprise a root canal instrument that is designed to drill the tooth surfaces, in particular one or more interchangeable endodontic files, and an associated electric motor designed to drive said instrument in a predetermined working motion, typically unidirectional rotation.

In particular, different types of dedicated micromotors for endodontic care are used, all of which have very similar characteristics relating to the type of file used by the device during the work. The motors used all have a file rotation speed of between 100 and 1000 rpm with a maximum torque limit of around 8 N/cm.

In recent years, the use of nickel titanium instruments for endodontic preparation has become more widespread.

Said instruments can be used in root canals with a continuous rotary movement provided by a handpiece connected to an endodontic motor, which enables rotational speeds of between 100 and 1000 rpm.

Continuous rotation at this speed enables high-performance high-speed work.

Such rotational speeds can be used with Ni—Ti instruments, but cannot be used with traditional steel instruments, since Ni—Ti alloys are superelastic and are therefore flexible and elastic (or have shape memory), such as to enable the instrument to enter the canals while rotating, cutting the dentine circumferentially without deforming, even when following a curved path.

Devices driving the instrument in a reciprocal or alternating motion are known, rotating same in a direction of rotation at a given angle first clockwise and then anti-clockwise, or vice versa. This clockwise/anti-clockwise rotation cycle can be repeated very quickly during the treatment. Furthermore, in having two directions of rotation, the instrument has two potentially useful directions, with each direction having a specific function. For example, a file can be designed with dual functionality, in which the file cuts when rotating clockwise and polishes when rotating anti-clockwise, or vice versa.

In such known devices, the reciprocal action occurs at pre-set angular velocities and angles that cannot be changed, and said reciprocal action is maintained from the start of the movement until the end of the movement.

In recent times, nickel titanium (Ni—Ti) root canal instruments have been developed that are able to perform a reciprocal movement and that require specific rotational speed and angular velocity values in both directions of rotation in order optimize performance of the instrument and to minimize the drawbacks thereof, such as breakage during use.

In particular, the instrument is run continuously and caused to reciprocate at fixed angles when a predetermined set resistive torque is reached.

US 2015086937 A1, filed by Morita, describes a method for driving an endodontic instrument that controls the direct and inverse rotation as a function of the load/torque detected by the cutting means. In particular, the motor begins with a continuous rotary movement until a certain torque value is reached. When one of the predetermined torque values is reached, the predetermined reciprocal action is started.

DE 102007011725 B4, filed by Schlumbohm, describes an endodontic instrument with a reciprocal or twisting function having predefined values. There is an instant of delay when switching from the continuous movement and the twisting movement, and vice versa.

EP 2 431 004, filed by Nakanishi, discloses a motor control method for a dental handpiece configured to limit the motor current flowing through the motor when a specific load torque applied to the cutting tool exceeds a preset limit. The direction of rotation of the file is changed only occasionally.

WO2010/109464, filed by Forum Engineering, discloses a system for endodontic treatment comprising oscillation of a file through an arc $\alpha$ (e.g. 120°) at a certain frequency and starting from a certain angular position. After some time, the position of the oscillation center is advanced (e.g. for 60°) while maintaining the other parameters constant. Advancement of the position of the oscillation center along the circular arc is repeated until an entire circle is described.

US2013/0224677, filed by Morita Manufacturing, discloses a dental treating apparatus comprising a driving unit which is able to perform normal rotation, rotation opposite to normal rotation, and so called twist driving. The dental apparatus comprises a controller which compares a detected load applied to the cutting tool to predefined reference loads. When such reference load is exceeded, the controller either reduces rotation angle speed of normal rotation as compared to reverse rotation or reduces the rotation angle in the normal rotation as compared to the rotation angle of the reverse rotation.

One drawback of this prior art is the dependence on the type of material used for the endodontic instrument, since the parameters are rigid and pre-set for the specific material used.

Another drawback of the known endodontic devices is the risk of the instrument jamming or breaking when moving inside the canal.

Indeed, when in movement, if the instrument hits the canal wall as a result of being too long, the instrument can undergo a sudden uncontrolled forward acceleration, which may cause the instrument to jam, be damaged and even to break inside the root canal.

Another drawback of the known endodontic devices is the need to exert greater manual pressure on the handpiece, and therefore on the endodontic instrument, during the reciprocating movement, compared to the pressure exerted during a continuous movement.

This increases the risk of the endodontic instrument breaking, of debris being compacted towards the tip, and of dentinal defects (microcracks) appearing that could damage the tooth and cause the loss thereof (extraction).

Another drawback of the known endodontic devices is that the dental material is pushed towards the bottom of the root canal during forward movement of the instrument with a fixed reciprocating motion.

Another drawback of the prior art is that the beneficial effects of periodic reciprocation of a movement of the endodontic instrument, also called twist driving, have not always been taken into account when designing a motor control which is responsive to measured torque.

Another drawback of the prior art is that, while rotational patterns to reduce the load applied to the endodontic file are well known in the art, there are no patterns disclosed which allow the cutting force to be either reduced or intensified depending on the resistance experienced by the instrument. It is, however, important to provide a function to increase forward rotational angle and/or forward rotational angle speed in order to prevent the dentist from having a perception of "stall" of the instrument and to, therefore, exert an unnecessary force on the instrument.

The main objective of the present invention is to provide a device and a method for controlling an electric motor, in particular to move an endodontic instrument such as to achieve an entirely uninterrupted movement in all of the movement modes and with any type of endodontic instrument.

Another aspect of the present invention is to provide a device and a method for controlling an electric motor for moving an endodontic instrument such as to achieve the easy and fluid penetration of the root canal during endodontic shaping, with a consequent reduction in the pressure required to move the instrument forward.

Another aspect of the present invention is to provide a device and a method for controlling an electric motor for moving an endodontic instrument such as to reduce the debris pushed beyond the tip and microcracks, compared to fixed reciprocal actions with fixed predetermined parameters and angles.

Another aspect of the present invention is to provide a device and a method for controlling an electric motor for moving an endodontic instrument that is efficient and safe.

Another aspect of the present invention is to provide a device and a method for controlling an electric motor, in particular for moving an endodontic instrument made of any nickel titanium alloy, that is simple to use.

According to the application, the device and method for controlling an electric motor, in particular for moving an endodontic instrument has the following advantages:

provides a high degree of flexibility in the materials used for the endodontic instrument, being optimized both for conventional Ni—Ti instruments and heat-treated Ni—Ti instruments, enables operation at suitable speed and torque values at all times, reduces the risk of excessive torque and pressure being applied to the instrument, reduces the accumulation of stress inside the material of the endodontic instrument, reduces the risk of stalling, enables the continuous removal of material and debris from the root canal, enables activation of endodontic instruments with a movement that is adjusted continuously and automatically as a function of the type of root canal being treated and the instrument being used.

The present invention concerns a device for controlling an electric motor, in particular for moving an endodontic instrument, as defined in attached Claim 1 and by the preferred embodiments thereof, as described in Claims 2 to 20.

The present invention also concerns an electric motor that is designed to rotate an endodontic instrument, using a device such as the one defined in attached Claim 21.

The present invention also concerns a method for controlling an electric motor, in particular for moving an endodontic instrument as defined in attached Claims 22 to 25, and a method for controlling an endodontic instrument as defined in claim 26.

The above mentioned problems remaining in the prior art are solved by a device for controlling an electric motor for moving a tool, in particular for moving an endodontic instrument, said device being configured to cause the tool to perform a sequence of movements (M1, M2) as a function of the signals received from at least one sensor. The sequence of movements (M1, M2) comprises an initial movement (M1) being a continuous forward rotation in which the motor is driven in a normal direction of rotation, causing a high torque intensity on the tool, and maintaining such movement until a first maximum threshold limit (LM1) is surpassed. When said first maximum threshold limit (LM1) is surpassed, the device is configured to switch to a first alternating movement (M2) in which the motor is driven in an alternating rotation, causing a lower torque intensity on the tool than initial movement (M1), and maintaining such movement until a first minimum threshold (Lm1) is fallen below. When a first minimum threshold (Lm1) is fallen below, the device is configured to switch back to initial movement (M1) and to, in (M1), observe the conditions for maintaining movement (M1) or switching back to movement (M2).

The electric motor may for example be an AC, DC or BL-DC (brushless DC) motor or micromotor of a known type.

The at least one sensor is designed to receive a signal (S_mtr1) from said electric motor and to forward a signal (S_snr1) indicating a set of characteristic operating parameters of the motor to a processing unit.

The device is configured to, when used as intended, move the tool according to a sequence of movements. The movements can be continuous rotational movements or can be alternating movements, that is repeated rotations in a normal direction, each of them followed by a rotation in a reverse direction. The movements have different intensities, depending on the rotational speed, depending on the power supplied to the device, depending on the rotation angle chosen for the normal and the reverse movement respectively, and depending on the pause taken when the direction of rotation of the drive shaft is inverted.

By normal movement or continuous forward movement is understood a rotation around a longitudinal axis of an instrument in a rotational direction where the instrument, preferably an endodontic file, exerts a substantial cutting force on the root canal.

By reverse movement is understood a rotation around a longitudinal axis of an instrument opposite to the normal rotation, in a rotational direction where the tool, preferably an endodontic file, exerts a cutting force lower than the cutting force exerted during normal rotation. In the reverse movement, the endodontic file may have merely polishing function.

By twisting movement or alternating movement is understood a rotation around a longitudinal axis of an endodontic instrument in a normal direction through a first angle of rotation, followed by a rotation around the same longitudinal axis of an endodontic instrument in the reverse direction through a second angle of rotation, while the normal and reverse rotations are repeated periodically. The alternating movement is a forward movement, though not a continuous movement. It follows a regular pattern and causes less torque intensity on the tool than the normal movement.

Whether or not the normal rotation/reverse rotation follows a clockwise or an anticlockwise sense depends on the respective surface properties of the blade of the tool. In particular, it depends on the cutting ability and/or polishing ability of the blade when rotated in a clockwise or anticlockwise sense.

It is an advantage of the present invention that depending on the parameters chosen for each movement (M1, M2) and due to the possibility to switch from one movement to the other when a predefined maximum or minimum threshold is surpassed, unique treatment sequences for each root canal result. The sequences are built up based on the results measured by the sensor, without a need for the dentist to decide on the steps to be followed.

The switch from one to the next movement (from M1 to M2) as well as the switch from an advanced movement to one of the previous movements (M2 to M1) is chosen automatically based on a feedback value that a sensor receives and which is compared by the processing unit to a predefined threshold value. The values received from the sensor might be processed before comparing it to a predefined threshold value. Preferably the feedback value reflects the torque load experienced by the tool.

Basing the choice of sequence on such feedback signal provided by a sensor turns out to be more accurate and less error prone than a sequence chosen, somewhat arbitrarily, by the dentist. In other words, the root canal treatment which is performed by means of the disclosed instrument does not depend on the skill of the dentist. When using conventional driving means for endodontic instruments, the dentist must perform "pecking" movements or "up and down" movements in order to avoid stall and to continuously forward the root canal processing, while allowing relief to the strained instrument as appropriate. When using a device according to this invention, such up-and-down movement is no longer necessary due to the ability of the device to switch either to higher torque load rotational treatment of the tool or to lower torque load rotational treatment of the tool. An automatic switch between different levels of torque intensity movements avoids blocking of the file and provides for progression instead. Excessive torque or uncontrolled pecking movements, both involving a risk of breakage of the instrument, can be reduced. Due to the adaptability of the movement sequence, the dentist can treat the root canal by applying continuous light pressure towards the apex. The torque load experienced by the instrument is monitored and kept within reliable limits. More safe and continuous advancement is ensured.

In a preferred embodiment of the invention, the device is configured to cause the tool to additionally perform a second alternating movement (M3) causing a lower torque intensity on the tool than the first alternating movement (M2). The switch form the first alternating movement (M2) to the second alternating movement (M3) is triggered when during performance of the first alternating movement (M2) a second maximum threshold (LM2) is surpassed. In the second alternating movement (M3), the device is configured to switch back to one of the previous movements (M1 or M2), when a second minimum threshold (Lm2) or third minimum threshold (Lm3) is fallen below. In particular, the device switches back to the initial movement (M1), when a third minimum threshold (Lm3) is fallen below, and the device switches back to the first alternating movement (M2), when a second minimum threshold (Lm2) is fallen below. When performing such previous movements (M1, M2), the conditions for maintaining one of the previous movements (M1,M2) or for switching to a neighboring movement are again observed.

It is an advantage of this preferred embodiment that the device offers more levels of torque applied to the instrument and thus more levels of intensity of treatment. This allows for more precise treatment which is better adaptable to the shape and hardness of the processed areas of the root canal.

Starting from one of the alternating movements (M2 or M3), the sequence can jump back to one of the previous movements, if the feedback value falls below at least one of two predefined threshold values. Due to this switch back to higher intensities, the dentist is not induced to apply unnecessary force by pushing the instrument towards the apical part of the root canal. Unnecessary strain experienced by the instrument can be avoided and the risk of breakage can be reduced.

In a preferred embodiment, the device is configured such that, in the first alternating movement (M2) or in the second alternating movement (M3), after completion of a predefined angle $\alpha_2$ of rotation ($\alpha_{effective} > \alpha_2$) or $\alpha_3$ of rotation ($\alpha_{effective} > \alpha_3$) respectively, the device automatically switches to the previous higher torque movement or to the subsequent lower torque regardless of any threshold value being reached. Whether or not the switch occurs to a lower torque intensity movements or to a high torque intensity movement then depends on whether or not the characteristic parameters received from the motor (S_snr1, S_snr2) are above or below a mean value of RS, current drawn by the motor, force absorbed by the motor, or surpass a predefined RS error value. It is an advantage of this embodiment that the user does not experience stagnation. Such feeling of stagnation could result from an instrument staying for a substantial amount of time in an alternating movement. The maximum angles of rotation $\alpha_2$ and $\alpha_3$ can thus improve controlled handling of the device.

It is not foreseen that the sequence jumps a subsequent movement, for example, it is not foreseen that the second alternating movement (M3) is executed right after movement M1. Continuous advancement allows to proceed from (M1) to (M2) and to (M3) through directed, controlled decrease of intensity of the treatment without disruption. However, jumping an intensity decreasing level is, though not preferred, still within the scope of the present invention.

It goes without saying that more alternating movements M3', M3", M3"' and so on, causing even lower torque intensity on the tool, can follow alternating movement M3. In this case, the switch form the second alternating movement (M3) to the subsequent alternating movement (M3') is triggered when during performance of the second alternating movement (M3) a third maximum threshold (LM3) is surpassed.

In another preferred embodiment of the invention, the device is configured to cause the tool to additionally perform a conclusive movement (M4) in which the motor is driven in a continuous reverse rotation, causing a low torque intensity on the tool. The switch form the second alternating movement (M3) to conclusive movement (M4) is triggered when during performance of the second alternating movement (M3) a third maximum threshold (LM3) is surpassed.

When the conclusive movement (M4) is performed, the device can be particularly well be removed from the root canal. The conclusive movement can also support removal of debris from the root canal. By conclusive movement (M4) is meant the movement concluding one treatment cycle. The conclusive movement causes less torque on the instrument than its predecessor movements within one treatment cycle do.

In a preferred embodiment, the device is configured such that, in movement M4, after completion of a predefined angle $\alpha_4$ of rotation ($\alpha_{effective} > \alpha_4$), the device automatically switches to initial movement (M1) regardless of any threshold value being reached. The device may thus be configured, and such configuration is preferred, to repeat the treatment cycle after occurrence of M4. It is an advantage of repetition of treatment cycles that continuous advancing of the treatment is ensured without the need for the user to apply pressure towards the apex. Such repetition of cycles is discussed below in greater detail.

In a preferred embodiment, the device for controlling an electric motor for moving a tool, in particular for moving an endodontic instrument, comprises, a first sensor that is designed to receive a signal (S_mtr1) from said electric motor and to generate a signal (S_snr1) indicating first characteristic operating parameters (RS; RD; RP; PS) of the motor.

The device further comprises a control unit that is in data communication with said motor and said first sensor, the control unit comprising
- a drive unit that is designed to power the motor by means of a power supply voltage (S_drv);
- a second sensor that is designed to generate a feedback signal (S_snr2) that is proportional to a second operating parameter received from the motor, said second sensor being in data communication with the drive unit; and
- a processing unit in data communication with said drive unit, said first sensor and said second sensor.

Said processing unit is designed to cause the endodontic instrument to perform a sequence of forward movements (M1, M2) by acting on said electric motor as a function of the first signal (S_snr1) received from the first sensor and the second signal (S_snr2) received from the second sensor, the sequence of movements (M1, M2) comprising a start with a continuous forward movement (M1) in which the motor is driven in rotation with a first supplied power (PS1), a first rotational speed (RS1) and a first direction of rotation (RD1). When a first threshold limit (LM1) is surpassed, a first alternating movement (M2) is started. In the first alternating movement, the motor is driven in rotation with a second supplied power value (PS2), a second rotational speed (RS2), a first clockwise angle of rotation (CWA2), a first anti-clockwise angle of rotation (CCWA2) and a second pause (RP2) between said first clockwise angle of rotation (CWA2) and said first anti-clockwise angle of rotation (CCWA2).

Preferably, the device is configured such that in the first alternating movement (M2) a lower torque intensity is applied on the tool than in initial Movement M1. Movement (M2) is maintained until a first minimum threshold (Lm1) is fallen below. In the case of falling below Lm1, the device is configured to switch back to the initial movement (M1) and to, in M1, observe the conditions for maintaining initial movement (M1) or switching back to the first alternating movement (M2).

For the purposes of this invention, by the characteristic parameter of the motor "RSX" is understood the rotational speed of the drive shaft; by the characteristic parameter of the motor "RDX" is understood the direction of rotation of the drive shaft; by the characteristic parameter of the motor "CWAX" is understood the clockwise angle of rotation of the drive shaft; by the characteristic parameter of the motor "CCWAX" is understood the anti-clockwise angle of rotation of the drive shaft; by the by the characteristic parameter of the motor "RPX" is understood the pause time in one of the alternating movements (M2 or M3) when the direction of rotation of the drive shaft is inverted.

In a preferred embodiment, the device comprises a first sensor which is designed to receive a signal (S_mtr1) from the electric motor. The sensor forwards the signal (S_snr1) to the processing unit within the control unit. The signal indicates a set of first characteristic operating parameters of the motor. The characteristic parameters in particular include RSX, RDX, CWAX, CCWAX and RPX.

In a preferred embodiment the first sensor is a Hall effect sensor which more preferably consists of a set of three Hall effect sensors that enables identification of six different phases of forward movement of the motor. The first sensor can preferably be an encoder position sensor, translating the angular position of the drive shaft into a digital value. By means of the Hall effect sensor or sensors, a speed error may be detected, that is a deviation from the set speed. The speed error can be calculated by a suitably calibrated proportional-derivative controller. By means of three Hall effect sensors, the relevant characteristic parameters of the motor are detectable. Feedback from additional, optional sensors can be used as indicators for verifying accuracy of the calculated values.

In a preferred embodiment, the control unit is in data communication with the motor and the first sensor. The control unit comprises a drive unit, it comprises a second sensor, and it comprises a processing unit.

The drive unit is designed to power the motor by means of a supply voltage (S_drv). The drive unit preferably receives a signal (S_drv) from a power regulator to regulate the electrical power to be sent to the motor and, additionally, a signal from the processing unit. In particular, the control unit regulates the period of the PWM signals to be sent to the driver while the power regulator regulates the duty cycle of the PWM signal to be sent to the driver.

The second sensor is designed to receive a second operating parameter of the motor. Preferably, the second sensor measures the current drawn by the motor. However, the second sensor can be a force sensor designed to forward a feedback signal (S_snr2) proportional to the force absorbed by the motor. The second sensor serves as an indicator of the load to which the motor is subject in order to determine any movement switches.

It is an advantage of the present invention that the control system is able to evaluate the torque applied to the instrument based on the feedback of one, preferably two sensor units.

More details on the first and the second sensor, the control unit, the drive unit, the processing unit and the data communication between the units are given in the section discussing examples and figures.

The processing unit receives the signals from the first and, the second sensor (S_snr1, S_snr2) and is designed to cause the tool to perform the sequence of movements (M1, M2) described earlier. The processing unit, in particular, compares the data received form a sensor and compares the data to predefined values which are stored in a memory unit. Based on the signals received from the sensor, the processing unit may calculate values which can be compared to at least one of the predefined threshold values LM1, LM2, Lm1, Lm2, Lm3. Threshold values LM1, LM2, Lm1, Lm2, Lm3 reflect a torque experienced by the endodontic instrument.

In a preferred embodiment, the processing unit is designed to cause the endodontic instrument to perform a sequence of forward movements (M1, M2, M3). When a second threshold limit (LM2) is surpassed, a second alternating movement (M3) is started in which the motor is driven in rotation with a third supplied power value (PS3), a third rotational speed (RS3), a third clockwise angle of rotation (CWA3), a third anti-clockwise angle of rotation (CCWA3) and a third pause (RP3) between said third clockwise angle of rotation (CWA3) and said third anti-clockwise angle of rotation (CCWA3).

The second threshold limit LM2 is a maximum value and the started second alternating movement (M3) causes lower torque intensity on the tool than the first alternating movement (M2).

In the second alternating movement (M3), the device is further configured to switch back to one of the previous movements (M1 or M2), when a second minimum threshold (Lm2) or third minimum threshold (Lm3) is fallen below. In particular, the device switches back to the initial movement (M1), when a third minimum threshold (Lm3) is fallen below, and the device switches back to the first alternating movement (M2), when a second minimum threshold (Lm2) is fallen below. When performing the previous movements (M1, M2), the conditions for maintaining one of the previous movements (M1,M2) or for switching to a neighboring movement are observed.

In a preferred embodiment of the invention, the device is configured to, when the third threshold limit (LM3) is surpassed, start a fourth reverse movement (M4), in which the motor is driven to withdraw the endodontic instrument from the canal. For example the blade of the file can be structured in a way that, when performing reverse movement (M4), the tool has merely polishing function. The fourth movement allows for relief of strain and safe removal of the instrument. Preferably, the conclusive movement (M4) is a continuous reverse rotation in which the motor is typically driven with a fourth supplied power (PS4), a fourth rotational speed (RS4) and a fourth direction of rotation (RD4).

The benefit of having several alternating movements and a reverse movement is improved adaptability of the sequence (M1, M2, M3, M4) to the shape and hardness of the processed areas of the root canal. The advantages of switching form low torque intensity movements back to higher torque intensity movements have been described earlier.

In one embodiment, the characteristic operating parameters of the motor (9) relating to the forward movement (M1, M2, M3) are selected such as to satisfy one or more of the following rules: a) if the first direction of rotation (RD1) is clockwise, then CWA2>CCWA2;
  b) if the first direction of rotation (RD1) is anti-clockwise, then CWA2<CCWA2;
  c) if the first direction of rotation (RD1) is clockwise, then CWA3>CCWA3;
  d) if the first direction of rotation (RD1) is anti-clockwise, then CWA3<CCWA3;
  e) RS1>RS2>RS3;
  f) |CWA2−CCWA2|>|CWA3−CCWA3|;
  g) PS1<PS2<=PS3.

It is an advantage of rules a and b, that —regardless of the properties of the cutting blade of the file—in the first alternating movement, the rotation angle of the normal or forward movement is larger than the rotation angle of the reverse movement. Substantial cutting activity can be ensured.

It is an advantage of rules c and d, that—regardless of the properties of the cutting blade of the file—in the second alternating movement, the rotation angle of the normal or forward movement is larger than the rotation angle of the reverse movement. Substantial cutting activity can be ensured.

It is an advantage of rule e, that rotational speed RS is continuously decreased from the initial movement (M1) over the first alternating movement (M2) to the second alternating movement M3. By choosing decreasing parameters, it is ensured that no excessive force or load is applied to the instrument and the risk of breakage is reduced. Moreover, the reduction of speed allows a reduced cyclic fatigue accumulation which is one of the main causes of Ni—Ti endodontic file intra-operative breakage. The rotational speed reduction is an advantage for instruments of large dimensions usually used in the shaping phase of root canal treatment that have a low cyclic fatigue resistance. Instruments with a low cyclic fatigue resistance usually have also a high torsional resistance, therefore, rule e can be indicated when Ni—Ti endodontic instruments are used in narrow and constricted root canals where the torsional stress could be very high.

It is an effect of rule f, that by setting the parameters for alternating as defined, excessive force or load applied to the instrument can be avoided. According to rule f, the delta of the rotational angle of the normal rotation minus the rotational angle of the reverse rotation is larger during the first alternating movement (M2) than during second alternating movement M3. The directional surface of the file having high cutting force therefore processes the root canal to a greater extent in the first alternating movement (M2) than it does in the second alternating movement (M3). This rule applies especially to shaping instruments that are used after creation of a glide-path, i.e. in the shaping phase. They should cut from the beginning of their use. However, the decreasing delta between normal and reverse angle from the first (M2) to the second alternating movement (M3) allows for gradual shaping of the root canal and for decreasing creation of debris. The reduced amount of debris created can be easily removed.

Both rules e and f are particularly suitable when instruments are used for the shaping phase of the root canal. Rule e is particularly suitable when heat-treated Ni—Ti instruments are used in the shaping phase of the root canal treatment. Rule e may be changed to Rule e' when traditional Ni—Ti instruments are used in the shaping phase of the root canal treatment. According to alternative rule e", the rotational speed may be increased from movement (M1) to movement (M2) and again decreased from movement (M2) to movement (M3) (RS1<RS2>RS3).

When the sequence switches to lower cutting force movements (such as M2 or M3), the power supplied to the motor is preferably increased or, at least, kept constant. It is an advantage of this rule (g) that the supplied power is increased as the instrument experiences increasing friction. By providing such increased power the risk of blockage of the file can be reduced.

Optionally, also the duration of the pauses between normal rotation a reverse rotation during alternating movements can be increased form a first (M2) to a second alternating movement (M3) in order to relief strain.

In an alternative embodiment, the characteristic operating parameters of the motor relating to the forward movement (M1, M2, M3) are selected such as to satisfy one or more of the rules a, b, c, d and g. However, in this embodiment, the characteristic parameters are selected to satisfy one or more of the following alternative rules e' and f':
  e') RS1<RS2<RS3
  f') |CWA2−CCWA2|<|CWA3−CCWA3|

Alternative rules e' and f' are particularly suitable when instruments are used for the glide-path phase of the root canal. Rule e' is particularly suitable when heat-treated Ni—Ti instruments are used in the glide-path phase of the root canal treatment. Yet another alternative rule e" is suitable when traditional Ni—Ti instruments are used in the glide-path phase of the root canal treatment. According to alternative rule e"', the rotational speed may be increased from movement (M1) to movement (M2) and again decreased from movement (M2) to movement (M3) (RS1<RS2>RS3).

Alternative rule e' can be suitable when, by applying higher centrifugal force to the instrument, torque load can be lessened. The reduction of torque applied on instruments reduces torsional stress accumulation, one of the main causes for intra-operative breakage of Ni—Ti endodontic instruments. Increasing rotational speed is an advantage for instruments of small dimensions usually used in the gliding path phase of root canal treatment that have a low torsional resistance. Instruments with a low torsional resistance usually have a high cyclic fatigue resistance. Therefore, alternative rule e' could be indicated when Ni—Ti endodontic instruments are used in curved root canals where the cyclic fatigue stress could be very high.

Similarly, alternative rule f' can be suitable when by providing the file with higher cutting force in M3 as compared to M2, torque load can be lessened. This is advantageous for high capacity advancement immediately after the root canal is accessed, that is when glide-path instruments are applied with the aim to create a smooth glide-path. The increasing delta between normal and reverse angle from the first (M2) to the second alternating movement (M3) allows for an easy advancement of the file inside the root canal.

Generally speaking, increasing or decreasing the rotational speed and/or the delta of rotational angles in M2 versus M3 will depend on the materials used (steel, traditional Ni—Ti, heat-treated Ni—Ti) and their relevant properties (flexibility, yield strength, hardness, torque resistance, cyclic fatigue resistance), on the size of the instrument as well as the type of root canal to be treated (curved shape, narrow shape). Also it will depend on the type and phase of the root canal treatment to be performed.

By offering different modes of operations and different characteristic parameters for the transitions of one movement to the other, the present invention turns out to be a highly adaptable tool.

Preferably, the second sensor of the device is a current sensor designed to generate a feedback signal (S_snr2) proportional to the current drawn by the motor and to send said signal to the processing unit. In an alternative embodiment, however, the second sensor of the device is a force sensor designed to generate a feedback signal (S_snr2) proportional to the force absorbed by the motor and to send said signal to the processing unit.

In a preferred embodiment, the device is configured to store reference values (RSi; RDi; CWAi; CCWAi; RPi) of the first characteristic parameters (RSX; RDX; CWAX; CCWAX; RPX) of each movement (Mi) of the sequence of forward movements (M1, M2, M3) are pre-set in a memory module in data communication with the processing unit. The stored values allow the processing unit to compare the reference values to effective values and to monitor possible deviations and discrepancies.

In a preferred embodiment, the device is configured to store reference values (MDi; MPCi; mPCi; mDi) for each maximum threshold limit (LMi) and each minimum threshold limit (Lmi). Each maximum threshold limit (LMi) and each minimum threshold limit (Lmi) includes one or more of the following values:
 a) maximum drive power consumption (MPCi) by the electric motor during the forward movement (Mi);
 b) energy draw time (MDi) by the electric motor above the maximum drive power consumption (MPCi);
 c) minimum drive power consumption (mPCi) by the electric motor in the forward movement (Mi);
 d) energy draw time (mDi) by the electric motor below the minimum drive power consumption (mPCi).

During operation, the processing unit may continuously process the retrieved values RSX; RDX; CWAX; CCWAX; RPX; PSX. The processing unit may then compare the results of such processing accumulated over time to the reference values MDi; MPCi; mPCi; mDi.

For the purposes of this invention, LMi shall mean a maximum threshold value and Lmi shall mean a minimum threshold value, both parameters reflecting the torque or load experienced by the tool. According to one embodiment of the invention, a maximum threshold limit LMi is surpassed, when either the time Ti elapsed between sending of the control signal (S_drv) and receipt of the incoming feedback signal (S_snr1) from the first sensor by the processing unit exceeds a predetermined value (MDi):

Ti>MDi or when the power drawn by the electric motor (S_snr2) exceeds a predetermined maximum drive power consumption value (MPCi) by the motor for a time (Ti) greater than the predefined maximum time (MDi):
 (Consumption >MPCi) during (Ti>MDi)

It is an advantage of the method based on the time difference between sending a control signal an incoming feedback signal that the second sensor detecting force or current drawn by the motor is made redundant.

It is an advantage of the method based on power consumption measured over time that values falling below a predefined minimum value mPCi can be detected.

According to the invention a minimum threshold limit Lmi is fallen below, when the power drawn by the electric motor (S_snr2) falls below a predetermined minimum drive motor power consumption value (mPCi) by the motor for a time (Ti) greater than the predefined maximum time (mDi).
 (Consumption <mPCi) during (Ti>mDi)

By advancing through the movement sequence in ascending index order M1, M2, M3, M4, the torque applied to the instrument is thus lessened.

More details and typical values for threshold torque, RS, CWA, CCWA are given in the section discussing examples and figures.

In a preferred embodiment, the device is configured such that during alternating movements (M2 and M3), the characteristic parameters of the motor are determined only within the phase of normal rotation, because the friction and, thus, the torque is highest when an angle that produces feed is described.

In an even more preferred embodiment, the characteristic parameters of the motor are determined only during the normal rotation phase where the rotation describes an inner angle of rotation $\alpha$, positioned between an initial angle of normal rotation $\alpha_1$ and a final angle of normal rotation $\alpha_f$. It has proven advantageous to neglect the characteristic parameters measured through an initial angle $\alpha_i$, preferably $\alpha_i=0°$ to 10°, of a normal rotation phase. More preferably, the parameters to be neglected are those measured through an angle of $\alpha_i=0°$ to 6° of the normal rotation phase. It has proven advantageous to also neglect the characteristic parameters measured through a final angle $\alpha_f$, preferably $\alpha_f=$(angle $\alpha$-20°) to (angle $\alpha$-0°), of a normal rotation phase, for example through an angle of 162° to 180° in case the normal rotation angle is 180°.

This phase of normal rotation is suitable to deliver values which best reflect the torque applied to the instrument. The initial phase is usually subject to high consumption of current and/or slow response of the instrument because a certain amount of energy is used to reverse the rotational direction. The final phase, on the other hand, might be subject to low consumption of current and/or little delay of response of the instrument. In particular, forcing a defined minimum angle $\alpha_i$ before the characteristic parameters are determined delivers greater stability and reliability of values.

In a preferred embodiment, the device is configured to automatically activate a warning sound when a predefined number nI of starts of reverse movement M4, preferably a predefined number between 5 and 15, is surpassed. The number of starts of reverse movements can be assessed by means of a counter which counts the number of starts of M4, nR. In addition to emitting the warning signal, the angle $\alpha_4$ defining the duration of movement (M4) can be increased, for example doubled or tripled, in order to allow the dentist to interrupt the treatment and/or to irrigate the tooth. If the operator chooses to interrupt the treatment by releasing the pedal, the counter nR is reset. Otherwise the counter is increased further, repeating the same behaviour when reverse movement (M4) is entered the next time. Most preferably, the number of cycles nI is 10.

This feature reminds the dentist to periodically remove the debris from the instrument. When the debris is not removed in due time, not only the cutting force of the blades may be impaired, there is also a risk that the dentist pushes debris towards the apex and creates dentin debris plugs which will block the advancement of the treatment. The feature serves patient safety. However, the dentist has the option, if he considers appropriate, to restart the engine for another number nI of treatment cycles.

In another embodiment, the device is configured to automatically activate a prolonged warning sound and to permanently maintain reverse movement (M4), when a predefined number nS of starts of reverse movement (M4) is surpassed. To exit reverse movement M4, the user must release the pedal and thus stop the engine. This feature is provided to indicate that the instrument has undergone substantial torque for numerous times and should be replaced in order to reduce the risk of fracture.

Both the warning sound after nI completed treatment cycles and nS completed treatment cycles have the advantage that they invite the dentist to re-evaluate the situation. They provide guidance for when to consider irrigation and when to replace the instrument.

Furthermore, the system can be better adapted to the type and shape of the root canal to be treated. For example, if the canal to be treated is not too narrow, there will be little torque on the instrument and it will be difficult to reach the value that leads to reverse movement (M4) and to the end of a treatment cycle. The warning signals will be emitted after considerable advancement of the instrument. In the case where, instead, the canal to be treated is very tight, there will be a lot of torque on the instrument and easily the value that leads to emission of a warning sound is reached. The higher number of times the dentist will be reminded to stop and to irrigate the tight canal is appropriate given that the instrument in the tight canal undergoes high strain. Blocking of the instrument and formation of apical debris plugs is prevented, due to the automatic signal periodically suggesting irrigation of the canal.

The invention also relates to a method for controlling an electric motor to move a tool, in particular an endodontic instrument, the control method including a sequence of movements (M1, M2) as a function of the signals received from a sensor. The method may additionally include a second alternating movement (M3) and/or a conclusive movement (M4).

The described properties of each movement and the conditions to switch from one to the other have been described above and will be given in the section describing examples and figures.

The invention also relates to a method for controlling an electric motor, in particular to move an endodontic instrument, including the following phases: receiving a signal (S_snr1) indicating first characteristic operating parameters (RSX; RDX; RPX; PSX) of the motor; powering the motor with a power supply voltage (S_drv); receiving a feedback signal (S_snr2) proportional to a second operating parameter of the motor; causing the endodontic instrument to perform a sequence of movements (M1, M2, M3, M4) by acting on said electric motor.

The described properties of each movement and the conditions to switch from one to the other have been described above.

Other characteristics and advantages of the invention are given in the description of a non-exclusive preferred embodiment and the variants thereof, given by way of non-limiting example with reference to the attached drawings, in which.

Figure 1:
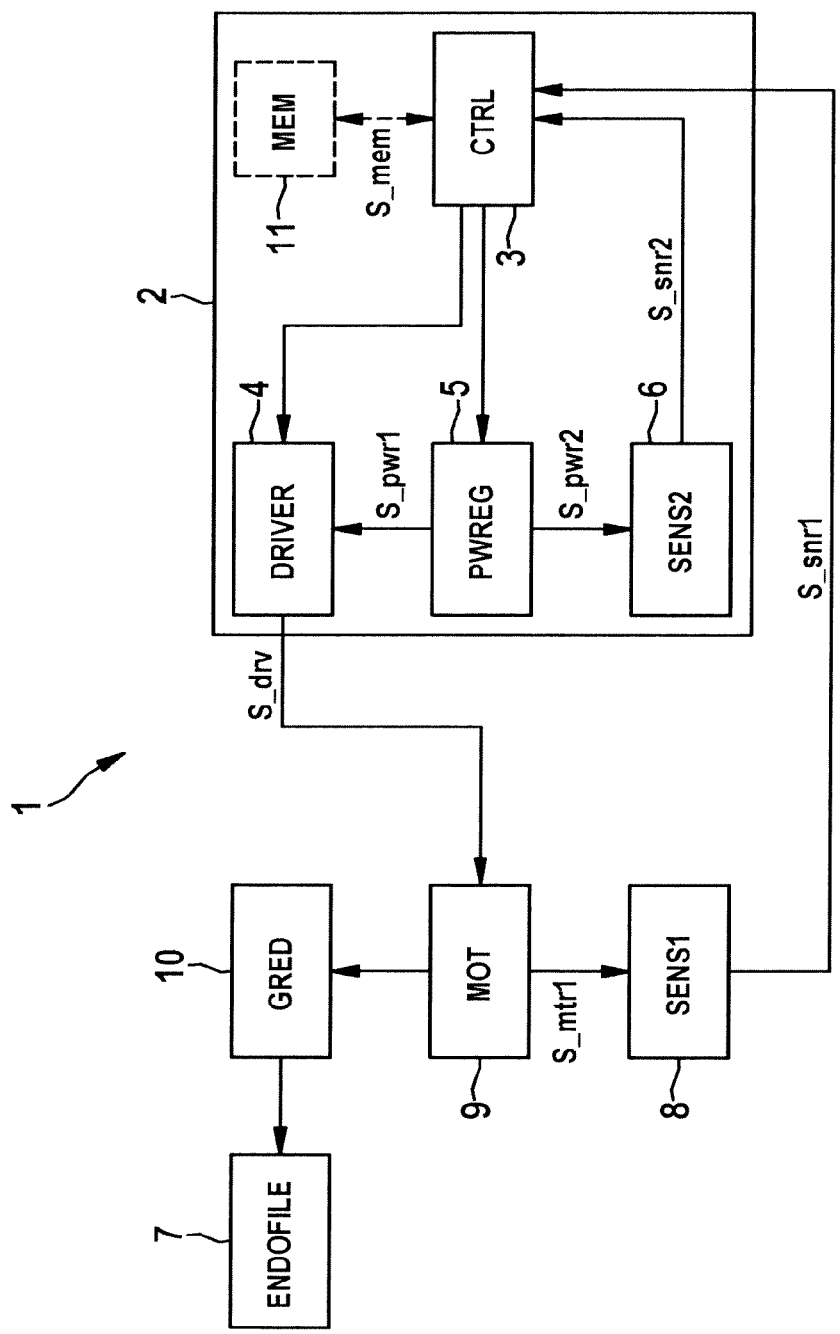
FIG. 1 is a schematic functional block diagram of an endodontic device according to one embodiment of the present invention.

With reference to FIG. 1, an endodontic device according to one embodiment of the invention is indicated as a whole using reference sign 1.

The device 1 principally comprises a control unit 2 that is designed to cause the endodontic instrument 7 to perform a sequence of movements, and a motor 9 designed to drive the endodontic instrument 7 in rotation.

A reduction gear 10 is preferably arranged between the motor 9 and the endodontic instrument 7.

The motor 9 is preferably an electric motor and may for example include an AC, DC or BL-DC (brushless DC) motor or micromotor of a known type.

Figure 3:
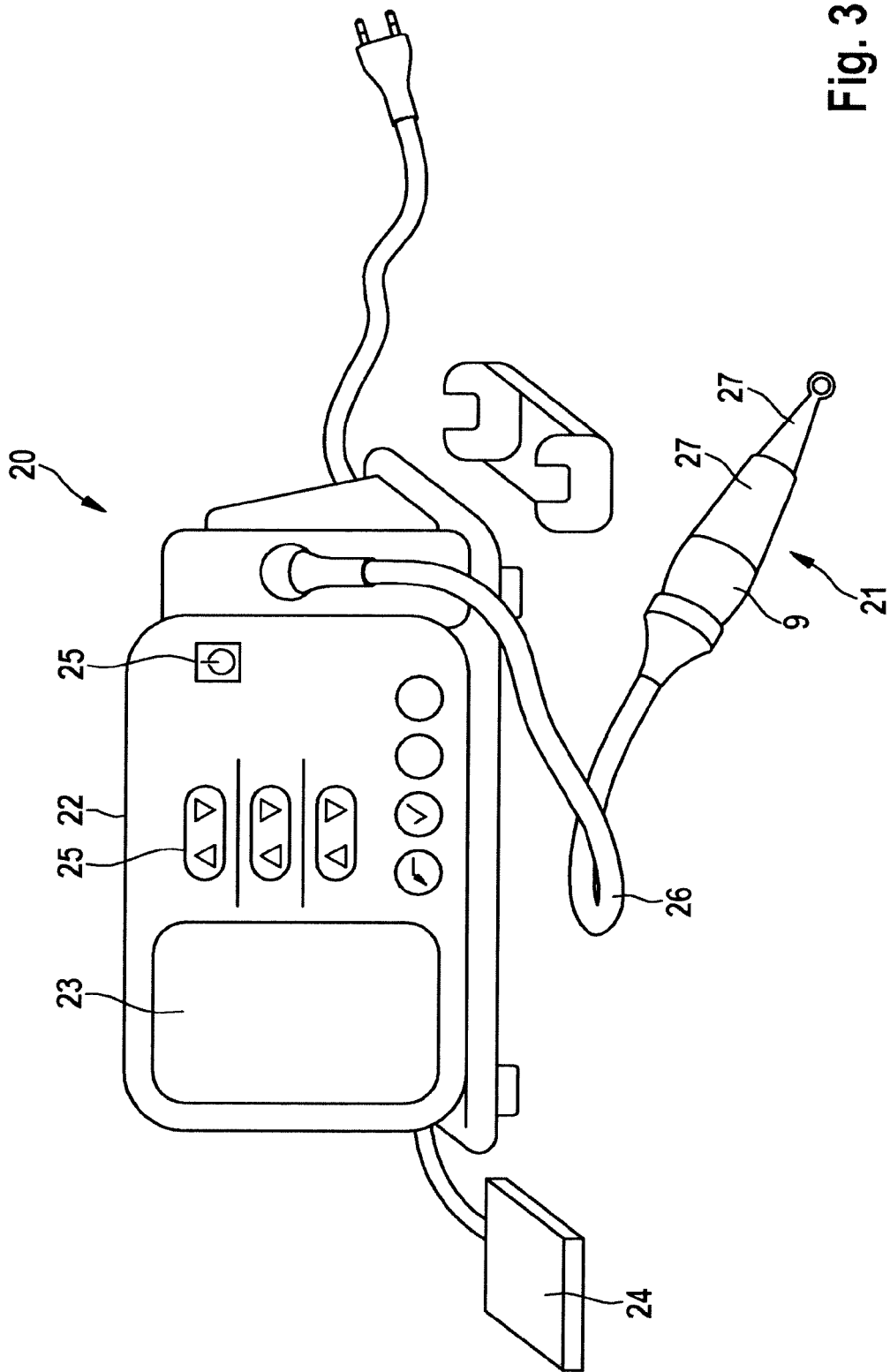
FIG. 3 is a schematic view of an endodontic system including the device in FIG. 1.

The electric motor 9 preferably has a cylindrical body arranged in a tubular seat (as shown in FIG. 3).

The electric motor 9 is able to move a drive shaft that is connected via a handpiece to the endodontic instrument 7.

The electric motor 9 is associated with a first sensor 8 that is designed to receive a signal S_mtr1 from the motor 9 and to generate a signal S_snr1 in real time indicating first characteristic operating parameters RS, RD, RP, PS of the motor 9.

The first characteristic parameters of the motor 9 may include one or more of the following: rotational speed RSi of the drive shaft, the direction of rotation RDi of the drive shaft, the clockwise angle of rotation CWAi of the drive shaft, the anti-clockwise angle of rotation CCWAi of the drive shaft, the pause time RPi when the direction of rotation of the drive shaft 9 is inverted (where i is in the range 1 to 4, for example RS1, RD1, RP1, RS2; RD2, RP2, CWA2, CCWA2, etc.).

The first sensor 8 is preferably an inductive brushless sensor that is coupled to the drive shaft and designed to detect the angular position of the shaft and to enable feedback control of the position of an element rigidly connected to the drive shaft.

The first position sensor 8 is preferably a set of three Hall effect sensors that enables identification of six different phases of forward movement of the motor.

The first sensor 8 includes a rotor that is rigidly connected to the drive shaft and a stator carried on the housing of the electric motor 9 and arranged to face the rotor when in use.

The first sensor 8 can preferably be an encoder position sensor. Such a sensor or encoder translates the angular position of the drive shaft into a digital value (appropriately scaled).

The encoder used can be resistive, optical or magnetic.

The control device also includes a control unit 2 that is in data communication with the electric motor 9 and the first sensor 8.

The control unit 2 includes a drive unit 4 designed to power the motor 9 with a power supply voltage S_drv, and a second sensor 6 designed to generate a feedback signal S_snr2 proportional to a second operating parameter of the motor 9. The second sensor 6 is in data communication with the drive unit 4.

The second sensor 6 can be a current sensor designed to generate a feedback signal S_snr2 proportional to the current drawn by the motor 9 and to send said signal to the processing unit 3.

The feedback signal S_snr2 is preferably an analogue voltage value within the power supply range of the electric motor 9.

Alternatively, the second sensor 6 can be a force sensor designed to generate a feedback signal S_snr2 proportional to the force absorbed by the motor 9 and to send said signal to the processing unit 3.

The control unit 2 also includes a processing unit 3 in data communication with the drive unit 4, the first sensor 8 and the second sensor 6.

The control unit 2 is also preferably connected to a power regulator 5 designed to send a signal S_pwr1 to the drive unit 4. The signal S_pwr1 is used to regulate the electrical power sent by the driver 4 to the motor 9 by sending the signal S_drv. In particular, the control unit 3 regulates the period of the PWM signals to be sent to the driver 4 while the power regulator 5 regulates the duty cycle of the PWM signal to be sent to the driver 4. In general, it should be noted that, in the present context and in the subsequent claims, the control unit 2 is described as being split into different functional modules (memory modules or operating modules) solely for the purpose of describing the functionality thereof clearly and fully.

In fact, said control unit 2 can be a single electronic device suitably programmed to perform the functions described, and the different modules can be hardware units and/or software routines included in the programmed device. Alternatively or additionally, such functions can be performed by a plurality of electronic devices incorporating the aforementioned functional modules.

The control unit 2 can also have one or more processors for running the instructions contained in the memory modules.

The aforementioned functional modules can also be split between different local or remote processors as a function of the architecture of the network incorporating same.

The systems also include all of the means and/or memory modules and/or operating modules required to implement the functions described in the respective methods described.

The processing unit 3 is configured to cause the endodontic instrument 7 to perform a sequence of movements (M1, M2, M3, M4) by acting on the electric motor 9 as a function of the incoming first signal S_snr1 from the first sensor 8 and the second signal S_snr2 received from the second sensor 6.

The sequence of movements (M1, M2, M3, M4) includes a start with a continuous forward movement (Movement "M1") in which the electric motor 9 is driven in rotation with a first supplied power PS1, a first rotational speed RS1 and a first direction of rotation RD1.

When the first threshold limit L1 is surpassed, the processing unit 3 causes the motor to start a first reciprocating or alternating movement ("M2") in which the motor 9 is driven in rotation with a second supplied power value PS2, a second rotational speed RS2, a first clockwise angle of rotation CWA2, a first anti-clockwise angle of rotation CCWA2 and a second pause RP2 between the first clockwise angle of rotation CWA2 and the first anti-clockwise angle of rotation CCWA2.

When the second threshold limit L2 is surpassed, the processing unit 3 causes the drive shaft to perform a second alternating movement ("M3"), that is preferably different to M2, in which the motor (9) is driven in rotation with a third supplied power value PS3, a third rotational speed RS3, a third clockwise angle of rotation CWA3, a third anti-clockwise angle of rotation CCWA3 and a third pause RP3 between said third clockwise angle of rotation CWA3 and said third anti-clockwise angle of rotation CCWA3.

Preferably, when a third threshold limit L3 is surpassed, the processing unit 3 causes the motor to perform a fourth reverse movement M4 in which the motor 9 is driven to withdraw the endodontic instrument 7 from the canal. Subsequently, after a certain time (or delay), preferably between a few milliseconds and a few seconds, the motor can continue the movement M1.

The reference values RSi, RDi, CWAi, CCWAi, RPi of the first characteristic parameters of each movement Mi of the sequence of movements M1, M2, M3, M4 are pre-set in a memory module 11 in data communication with said processing unit 3. For example, the memory also contains the reference values RS2, RD2, CWA2, CCW2, RP2 of the first alternating movement M2.

The two tables below set out, by way of non-limiting example, values for threshold torque, rotation of the drive shaft, and clockwise and anti-clockwise angular rotation (for the alternating movements M2 and M3). The first table relates to traditional Ni—Ti endodontic instruments and the second table relates to heat-treated Ni—Ti endodontic instruments. Both tables relate to sequences suitable for the shaping phase of a root canal treatment.

| Traditional Ni—Ti instrument (shaping phase) | | | | |
|---|---|---|---|---|
| Movement | Torque Nw | rpm | CWA angle | CCWA angle |
| M1 | Start 0 | 250-300 | | |
|  | Finish 1.0-2.0 | | | |
| M2 | Start 1.0-2.0 | 250-350 | 160°-110° | 70°-20° |
|  | Finish down 0.5-0.8 | | | |
|  | Finish up 1.5-2.5 | | | |
| M3 | Start 1.5-2.5 | 150-250 | 120°-70° | 60°-10° |
|  | Finish down M2 1.3-1.5 | | | |
|  | Finish down M1 0.5-0.8 | | | |
|  | Finish up 4.0-5.5 | | | |
| M4 | Start 4.5-6.0 | 300-400 | | |

| Heat-treated Ni—Ti instrument (shaping phase) | | | | |
|---|---|---|---|---|
| Movement | Torque Nw (20-60% less traditional Ni—Ti) | rpm | CWA angle | CCWA angle |
| M1 | Start 0 Finish 0.6-1.2 | 300-450 | | |
| M2 | Start 0.6-1.2 Finish down 0.3-0.48 Finish up 0.9-1.5 | 300-400 | 220°-160° | 140°-90° |
| M3 | Start 0.9-1.5 Finish down M2 0.78-0.9 Finish down M1 0.3-0.48 Finish up 2.4-3.3 | 200-300 | 160°-120° | 110°-80° |
| M4 | Start 2.7-3.6 | 300-400 | | |

The continuous forward movement M1 preferably occurs with a full 360° rotation, clockwise or anti-clockwise depending on the specific endodontic instrument being used. If the endodontic instrument encounters significant resistance in the dental canal during the continuous forward movement M1, causing the torque for the movement M2 to be surpassed before the 360° rotation is completed, the consequent movement switch occurs immediately.

For example, if the torque suddenly rises, the movement M1 can be switched immediately to the movement M2 after just 150°, 200°, 300°, etc.

The continuous movement M1 can be clockwise or anti-clockwise (set in advance using a suitable pushbutton) depending on the endodontic instrument being used. In fact, all of the movements Mi can change direction. For example, if an instrument is designed to cut clockwise, the prevailing angle of all of the movements M1-M2 and M3 is clockwise (CW) and M4 is the reverse and anti-clockwise (CCW). On the other hand, if the instrument being used is designed for anti-clockwise rotation, as set previously in the device, all of the parameters M1, M2 and M3 can be identical but in the opposite direction, i.e. a prevailing forward movement component that is anti-clockwise (CCW) and the movement M4 is the reverse and clockwise.

In one embodiment, for traditional Ni—Ti endodontic instruments, it is advantageous to have the following rotational speed values for the drive shaft: M1=270 rpm, M2=300 rpm, M3=220 rpm.

Preferably, the rotational speed in the reverse movement M4 is the same but in the opposite direction, at the rotational speed of the movement M1.

In said embodiment, for heat-treated Ni—Ti endodontic instruments, it is advantageous to have the following rotational speed values for the drive shaft: M1=370 rpm, M2=320 rpm, M3=270 rpm.

The two tables below set out values for threshold torque, rotation of the drive shaft, and clockwise and anti-clockwise angular rotation (for the alternating movements M2 and M3). In contrast to the above example, the tables relate to sequences suitable for the glide-path phase of a root canal treatment. The first table relates to traditional Ni—Ti endodontic instruments and the second table relates to heat-treated Ni—Ti endodontic instruments.

| Traditional Ni—Ti instrument (glide-path phase) | | | | |
|---|---|---|---|---|
| Movement | Torque Nw | rpm | CWA angle | CCWA angle |
| M1 | Start 0 Finish 1.0-2.0 | 200-300 | | |
| M2 | Start 1.0-2.0 Finish down 0.5-0.8 Finish up 1.5-2.5 | 150-350 | 130°-70° | 70°-20° |
| M3 | Start 1.5-2.5 Finish down M2 1.3-1.5 Finish down M1 0.5-0.8 Finish up 4.0-5.5 | 100-400 | 100°-60° | 60°-10° |
| M4 | Start 4.5-6.0 | 300-400 | | |

It has proven advantageous, that the rotational speed RS of the drive shaft is 250 rpm in M1, 320 rpm in M2 and 200 rpm in M3, in accordance with rule e‴. It is further preferred that the normal angle in M2 is 102° (CWA) while the reverse angle in M2 is 60° (CCWA); it is preferred that the normal angle in M3 is 84° (CWA) while the reverse angle in M3 is 24° (CCWA).

In an alternative example for driving a heat-treated Ni—Ti instrument, values for threshold torque, rotation of the drive shaft, and clockwise and anti-clockwise angular rotation (for the alternating movements M2 and M3) have been chosen as set out in the table below:

| Heat-treated Ni—Ti instrument (glide-path phase) | | | | |
|---|---|---|---|---|
| Movement | Torque Nw (20-60% less traditional Ni—Ti) | rpm | CWA angle | CCWA angle |
| M1 | Start 0 Finish 0.6-1.2 | 400-600 | | |
| M2 | Start 0.6-1.2 Finish down 0.3-0.48 Finish up 0.9-1.5 | 350-700 | 140°-60° | 100°-40° |
| M3 | Start 0.9-1.5 Finish down M2 0.78-0.9 Finish down M1 0.3-0.48 Finish up 2.4-3.3 | 300-800 | 100°-50° | 80°-20° |
| M4 | Start 2.7-3.6 | 300-600 | | |

It has proven advantageous, in accordance with rule e′, that the rotational speed RS of the drive shaft is 480 rpm in M1, 580 rpm in M2, 750 rpm in M3 and 300 rpm in M4.

Alternatively, in accordance with rule e, the rotational speed RS of the drive shaft can be chosen to 600 rpm in M1, 580 rpm in M2 and 500 rpm in M3.

It is further preferred that the normal angle in M2 is 90° (CWA) while the reverse angle in M2 is 60° (CCWA); it is preferred that the normal angle in M3 is 72° (CWA) while the reverse angle in M3 is 30° (CCWA).

The memory module 11 preferably also contains the reference values for each threshold limit Li.

The reference values $MD_i$, $MPC_i$, $mPC_i$, $mD_i$ of each threshold limit Li (where i=1, 2, 3, 4) include one or more of the following values:
  a) maximum drive power consumption $MPC_i$ by the electric motor during the forward movement Mi,
  b) maximum time $MD_i$ that the energy drawn by the electric motor 9 is greater than the maximum drive power consumption $MPC_i$,
  c) minimum drive power consumption $mPC_i$ by the electric motor in the forward movement Mi,
  d) minimum time $MD_i$ that the energy drawn by the electric motor 9 is less than the minimum drive power consumption $mPC_i$.

Preferably, the reference values MDi, MPCi, mPCi, mDi of each threshold limit Li and the reference values RSi, RDi, CWAi, CCWAi, RPi of the first characteristic parameters of each movement Mi of the sequence of forward movements are stored in the memory 11, at least for traditional Ni—Ti instruments and/or shaping instruments and for heat-treated Ni—Ti instruments and/or glide-path instruments. When the operator sets the type of Ni—Ti instrument being used, using a suitable pushbutton, the pre-set values are loaded by the memory 11 into the processing unit 3.

Preferably, some of the pre-set values loaded into the processing unit can be modified by the operator using appropriate pushbuttons 25 on a control panel 22 including a display 23 that is in data connection with a user interface module, which is in turn connected to the processing unit 3. In particular, the pre-set parameters that can be modified by the operator may include the angle of rotation CW and CCW and the rotational speed.

Consequently, the movement of the endodontic instrument is automatic and pre-set as a function of the file type (traditional Ni—Ti or heat-treated Ni—Ti) and/or of the phase of treatment (shaping phase, glide-path phase), although the speed and angle threshold values thereof are freely modifiable.

Before the endodontic operation on the patient is started, the operator need only set the following two options, which depend on the endodontic instrument being used and involve selecting:
1. The direction of rotation (prevalence of CW or CCW direction as a function of the instrument if done with the blades for cutting CW or CCW),
2. The type of movement as a function of the instrument being used (traditional Ni—Ti or heat-treated Ni—Ti) and/or the phase of treatment (shaping phase/glide-path phase) to be performed. The operator of the endodontic device 1 uses the control panel 13 to select a specific endodontic instrument or file for a given endodontic treatment, for example by pushing pushbuttons 12. Once the specific endodontic instrument has been selected, the processing unit 3 loads the parameters optimised for said instrument and endodontic treatment from the memory 11. Consequently, once the specific pre-programmed operating method has been selected, the unit 3 automatically loads the alternating motion operating values for one or both directions of rotation.

The processing unit 3 is also able to perform one or more operating rules on the first characteristic operating parameters of the motor 9, including the alternative rules e', e'' and f' outlined hereinbefore. The first characteristic operating parameters of the motor 9 relating to each forward movement M1, M2, M3 are preferably selected such as to satisfy one or more of the following rules:
 a) if the first direction of rotation (RD1) is clockwise, then CWA2>CCWA2,
 b) if the first direction of rotation (RD1) is anti-clockwise, then CWA2<CCWA2,
 c) if the first direction of rotation (RD1) is clockwise, then CWA3>CCWA3,
 d) if the first direction of rotation RD1 is anti-clockwise, then CWA3<CCWA3,
 e) RS1>RS2>RS3,
 f) |CWA2−CCWA2|>|CWA3−CCWA3|,
 g) PS1<PS2<=PS3.

Figure 2A:
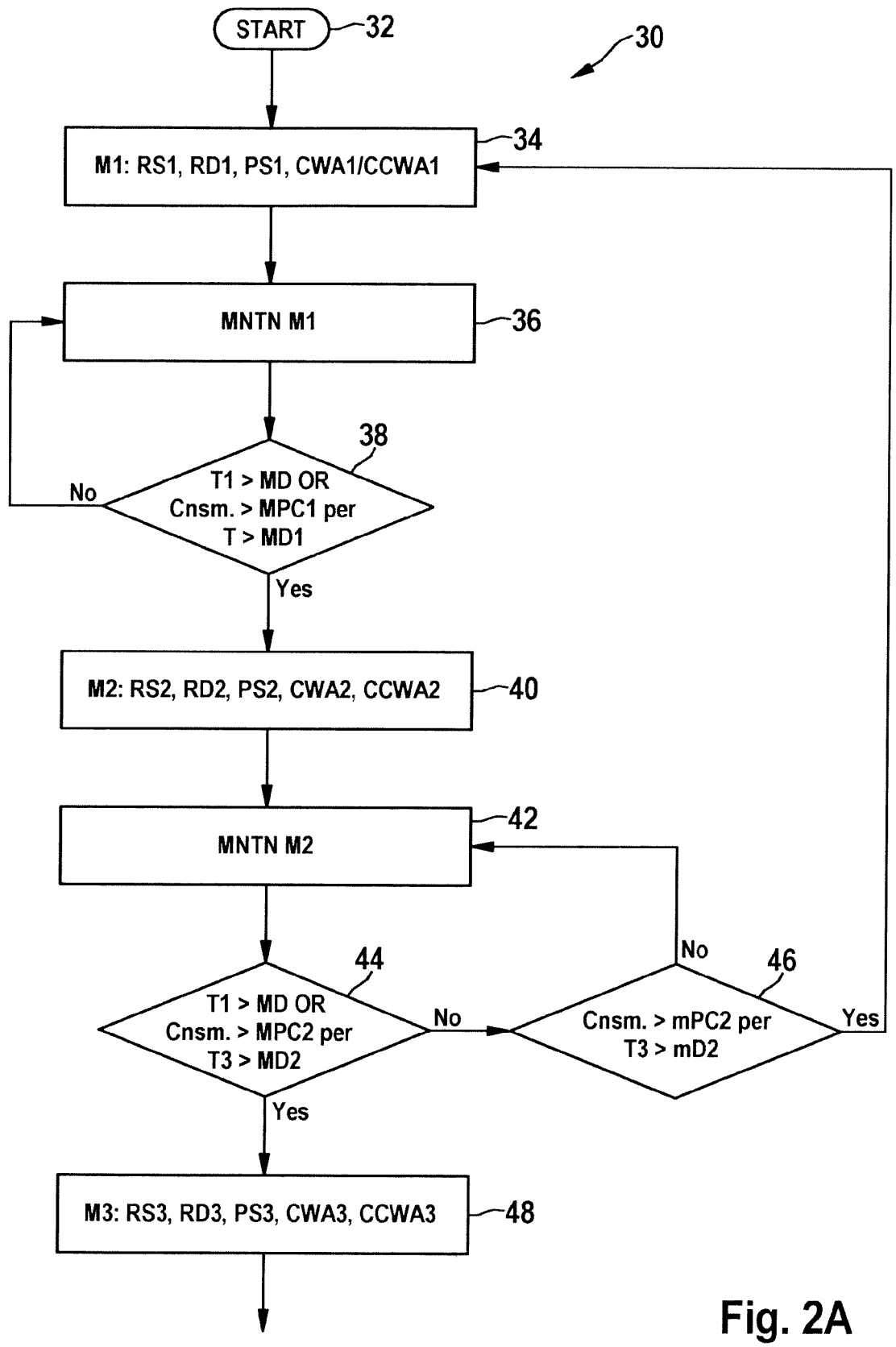
FIGS. 2A and 2B are schematic flowcharts of a method for controlling an electric motor, in particular for moving an endodontic instrument according to a first embodiment of the invention.
Figure 2B:
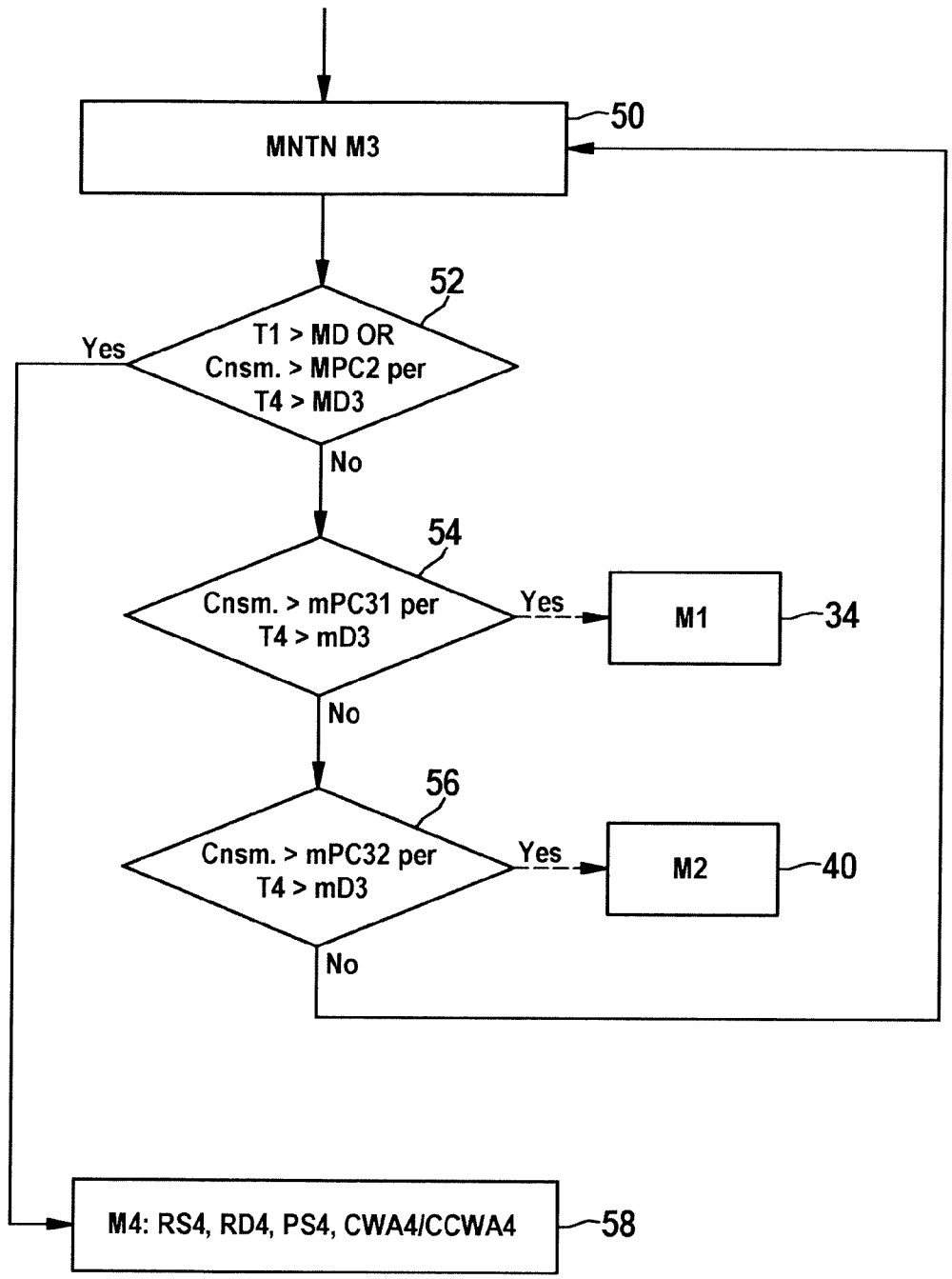

The invention also relates to a method for controlling an electric motor 9, particularly for moving an endodontic instrument 7, as shown in the flowchart in FIGS. 2A and 2B. Once the operator of the endodontic instrument has decided whether to use a traditional Ni—Ti instrument or a heat-treated Ni—Ti instrument, the operator enters this information into the system using the pushbuttons 25 of the control console 22. As illustrated above, the operator must also enter whether the endodontic instrument being used is made with blades for cutting clockwise (CW) or anti-clockwise (CCW). The control device automatically loads the threshold values characteristic of the endodontic instrument being used into the processing unit 3.

In particular, the control method includes the following phases:
 receiving a signal S_snr1 from the electric motor 9, preferably via a first sensor 8 linked to the motor 9, indicating first characteristic operating parameters RSi; RDi; RPi; PSx of the motor 9,
 powering the motor 9 with a power supply voltage S_drv,
 receiving, preferably from a second sensor 6, a feedback signal S_snr2 proportional to a second operating parameter of the motor 9,
 causing the endodontic instrument 7 to perform a sequence of movements M1, M2, M3, M4 by acting on the electric motor 9, preferably by means of a signal S_drv generated by a driver 4.

The sequence of movements M1, M2, M3, M4 includes:
 a start 32; 34 with a continuous forward movement M1 in which the motor 9 is driven in rotation with a first supplied power PS1, a first rotational speed RS1 and a first direction of rotation RD1;
 when a first threshold limit L1 is surpassed 38, the start 40 of a first alternating movement M2 in which the motor 9 is driven in rotation with a second supplied power value PS2, a second rotational speed RS2, a first clockwise angle of rotation CWA2, a first anti-clockwise angle of rotation CCWA2 and a second pause RP2 between the first clockwise angle of rotation CWA2 and said first anti-clockwise angle of rotation CCWA2;
 when a second threshold limit L2 is surpassed 44, the start 48 of a second alternating movement M3 in which the motor 9 is driven in rotation with a third supplied power value PS3, a third rotational speed RS3, a third clockwise angle of rotation CWA3, a third anti-clockwise angle of rotation CCWA3 and a third pause RP3 between the third clockwise angle of rotation CWA3 and the third anti-clockwise angle of rotation CCWA3.

The first threshold limit L1 for switching from the continuous forward movement M1 to the first alternating forward movement M2 is given by at least one of the following conditions (phase 38 in FIG. 3):
 a) the time t1 elapsed between the sending of the control signal S_drv and the receipt of the incoming feedback signal S_snr1 from the first sensor 8 exceeds a predetermined value MD, or
 b) the power drawn by the electric motor 9 exceeds a predetermined maximum drive power consumption value MPC1 by the motor for a time t2 greater than the maximum time MDi the energy drawn by the electric motor 9 is above MPC1. If the two conditions in (a) and (b) are not satisfied, the continuous forward movement M1 is maintained (phase 36 in FIG. 3).

The second threshold limit L2 for switching from the first alternating forward movement M1 to the second alternating forward movement M3 is given by at least one of the following conditions (phase 44 in FIG. 3):
 a) the time t1 elapsed between the sending of the control signal S_drv and the receipt of the incoming feedback signal S_snr1 from the first sensor 8 exceeds a predetermined value MD, or b) the power drawn by the electric motor 9 exceeds a predetermined maximum drive power consumption MPC2 by the motor for a time t3 greater than the maximum time MD2 the energy drawn by the electric motor 9 is above MPC2.

If the two conditions in (a) and (b) are not satisfied, the method skips to phase 46 in FIG. 3, in which if, during the first alternating movement M2, the power drawn by the electric motor 9 is less than the minimum drive power consumption mPC2 by the electric motor 9 for a time t3 greater than the energy draw time mD2, the processing unit 3 causes the endodontic instrument 7 to perform the continuous forward movement M1. Otherwise, the movement M2 is maintained (phase 42).

FIG. 3 shows an embodiment of an endodontic system 20 including the device 1 in FIG. 1. In particular, the system 20 includes a console 22 coupled operationally to the handle 21. In one embodiment, the handle 21 includes an electric motor 9, optionally a reduction gear 10, and a handpiece 27, the head of which can be coupled to the endodontic instrument 7. As illustrated previously, the system 20 is designed to rotate the instrument 7 clockwise or anti-clockwise. Although clockwise rotation has been described herein as the direction of forward movement of the instrument and anti-clockwise rotation has been described as the opposite direction, this description is provided by way of non-limiting example and the embodiments of the present invention are not limited to a specific relationship between the direction of forward movement or reverse movement and clockwise or anti-clockwise rotation. In the embodiment shown in FIG. 3, the console 22 can include a display 23 and a plurality of pushbuttons 25, for example for turning the system on and off or for configuring the type of endodontic instrument being used to treat the patient. The system 20 can preferably include a pedal 24 that can be actuated by the doctor to stop or restart the movement Mi of the endodontic instrument.

Figure 4:
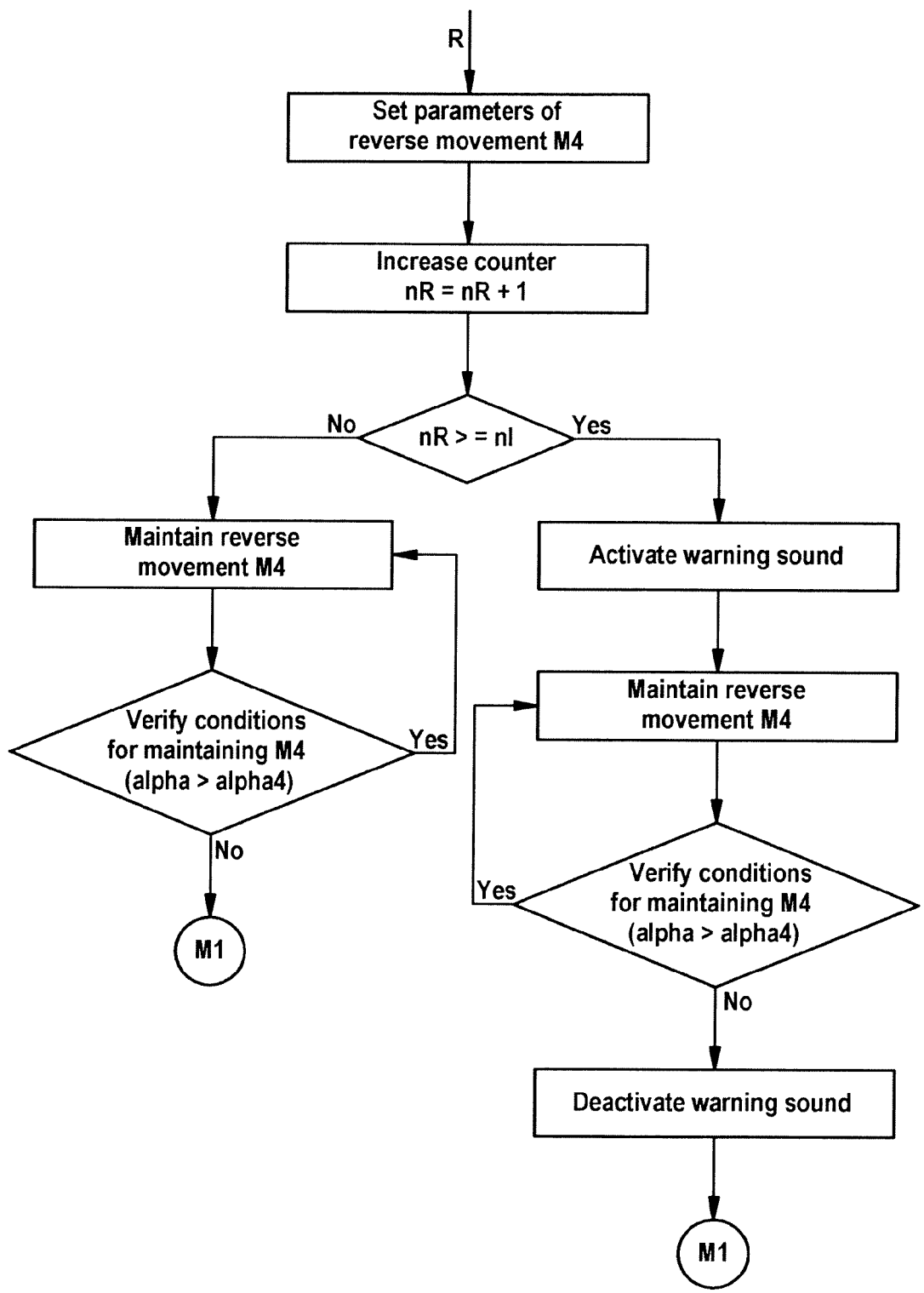
FIG. 4 is a schematic flowchart of a method for controlling an electric motor, executable during performance of reverse movement M4.

FIG. 4 shows an embodiment of the mechanisms operating during reverse movement M4. The parameters of reverse movement M4 are set, when the maximum threshold limit in M3 is surpassed (R). At the entry into M4, a counter is increased from nR to nR+1. While the nR value is still below a predefined reference value nI, reverse movement M4 is maintained for the duration of a certain rotation angle $\alpha_4$. The predefined reference value nR is preferably between 5 and 15 and most preferably 10. After completion of the rotation angle $\alpha_4$ the device switches back to normal forward movement M1. As soon as the counted nR value exceeds the predefined reference value nI, a warning sound is activated. The reverse movement M4 is maintained for the duration of a certain rotation angle $\alpha_4$, until the device switches back to normal forward movement M1. The reverse movement M4 may be prolonged.

Figure 5:
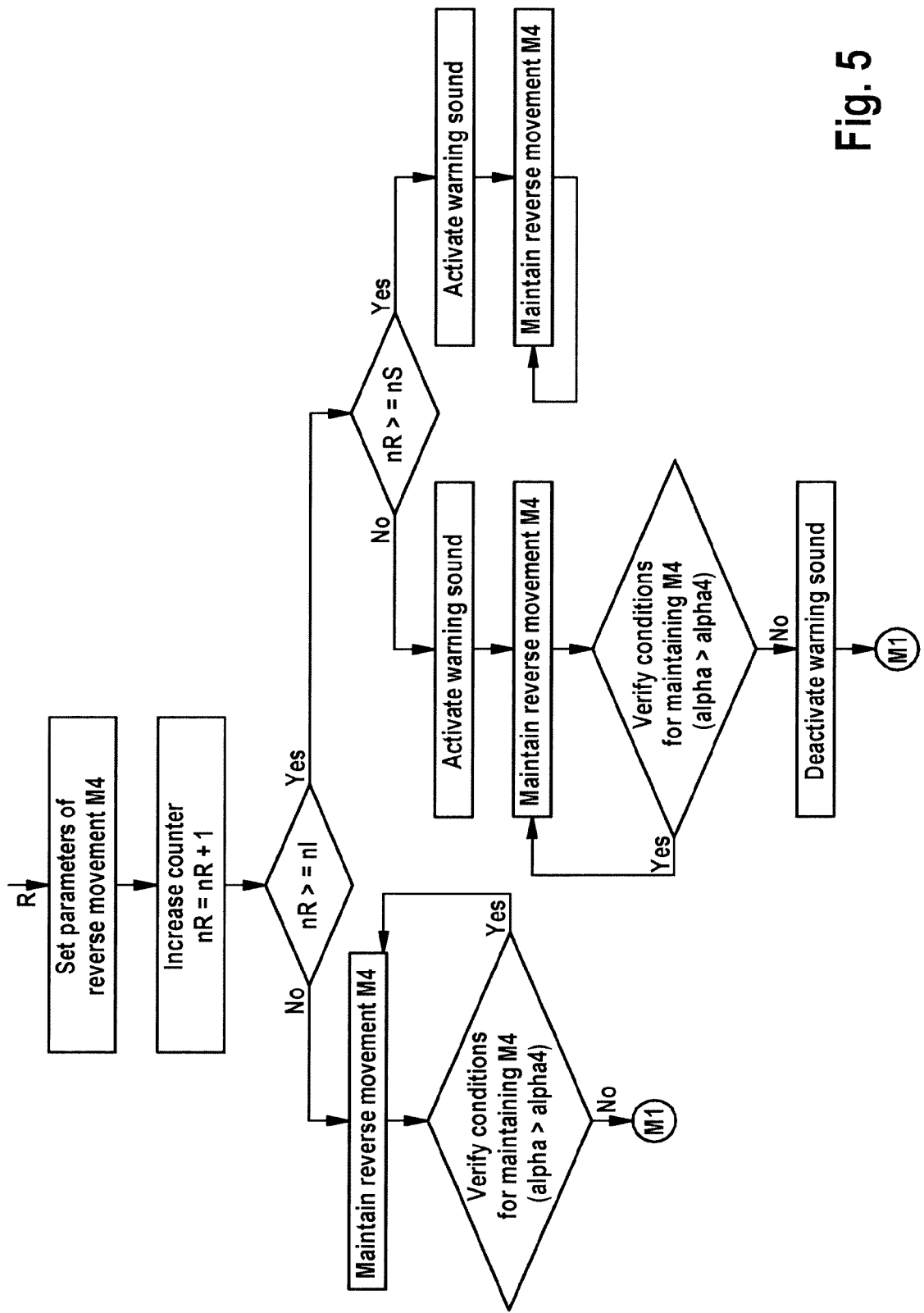
FIG. 5 is a schematic flowchart of an alternative method for controlling an electric motor, executable during performance of reverse movement M4.

FIG. 5 shows another embodiment of the mechanisms operating during reverse movement M4. The parameters of reverse movement M4 are set when the maximum threshold limit in M3 is surpassed (R). At the entry into M4 a counter is increased from nR to nR+1. While the nR value is still below a predefined reference value nI, reverse movement M4 is maintained for the duration of a certain rotation angle $\alpha_4$, as has been described with regard to FIG. 4. As soon as the counted nR value exceeds the predefined reference value nI, however, another evaluation is run. The counted value nR is compared to another reference value nS, higher than nI. While nR is still below reference value nS, a warning sound is activated and the reverse movement M4 is maintained for the duration of a certain rotation angle $\alpha_4$, until the device switches back to normal forward movement M1, as has been described with regard to FIG. 4. However, when the Sn value is surpassed, the device emits a prolonged warning sound and permanently performs reverse movement 4. This loop aspect is provided in order to invite the user to replace the file, which has undergone considerable strain for many times. Preferably, the nS value is chosen between 50 and 90. Most preferred is a value of 70.

The invention claimed is:

1. A device for controlling an electric motor for moving a tool, said device being configured to, when used as intended, cause the tool to perform a sequence of movements (M1, M2 or M3) as a function of the signals received from a sensor, the sequence of movements (M1, M2 or M3) comprising:

an initial movement (M1) being a continuous forward rotation in which the electric motor is driven in a normal direction of rotation, causing a high torque intensity on the tool, and maintaining such initial movement until a first maximum threshold limit (LM1) is surpassed; wherein when a first maximum threshold limit (LM1) is surpassed, the device is configured to switch to a first alternating movement (M2) in which the electric motor is driven in an alternating rotation, causing a lower torque intensity on the tool than initial movement (M1), and maintaining such movement until a first minimum threshold (Lm1) is fallen below; wherein when a first minimum threshold (Lm1) is fallen below, the device is configured to switch back to the initial movement (M1) and to further observe the conditions for maintaining the initial movement (M1) or switching to the first alternating movement (M2);

wherein the device is configured to, when used as intended, cause the tool to perform an second alternating movement (M3) in which the electric motor is driven in an alternating rotation, causing a lower torque intensity on the tool than the first alternating movement (M2), and wherein the switch from the first alternating movement (M2) to the second alternating movement (M3) is triggered when, during performance of the first alternating movement (M2), a second maximum threshold (LM2) is surpassed; and wherein, in the second alternating movement (M3) the device is configured to switch back to one of the previous movements (M1 or M2) when a second minimum threshold (Lm2) or third minimum threshold (Lm3) is fallen below; and wherein, when performing the previous movements (M1, M2), the conditions for maintaining one of the previous movements (M1,M2) or for switching to a neighboring movement are observed;

wherein an alternating movement is a rotation around a longitudinal axis of an endodontic instrument in a normal direction through a first angle of rotation, followed by a rotation around the longitudinal axis of the endodontic instrument in a reverse direction through a second angle of rotation, while the rotations in the normal and the reverse directions are repeated periodically.

2. The device according to claim 1, wherein the device is configured to, when used as intended, cause the tool to perform a conclusive movement (M4) in which the electric motor is driven in a continuous reverse rotation, causing a low torque intensity on the tool, wherein the switch from the second alternating movement (M3) to conclusive movement (M4) is triggered when, during performance of the second alternating movement (M3), a third maximum threshold (LM3) is surpassed.

3. The device according to claim 2, wherein the device is configured such that, during the conclusive movement (M4), after completion of a predefined angle ($\alpha_4$) of rotation ($\alpha_{effective} > \alpha_4$), the device is configured to automatically switch to the initial movement (M1) and to further observe the conditions for maintaining the initial movement (M1) or switching to the first alternating movement (M2).

4. The device according claim 1, in which the first characteristic operating parameters of the electric motor relating to the forward movement (M1, M2, M3) are selected such as to satisfy one or more of the following rules:
   a) if the first direction of rotation (RD1) is clockwise, then CWA2 >CCWA2;
   b) if the first direction of rotation (RD1) is anti-clockwise, then CWA2<CCWA2;
   c) if the first direction of rotation (RD1) is clockwise, then CWA3 >CCWA3;
   d) if the first direction of rotation (RD1) is anti-clockwise, then CWA3<CCWA3;
   e) RS1 >RS2 >RS3,
   e") RS1<RS2 >RS3;
   f) |CWA2-CCWA2|>|CWA3-CCWA3|;
   g) PS1<PS2<=PS3.

5. The device according to claim 1, in which the reference values (MDi; MPCi; mPCi; mDi) of each threshold limit (Li) include one or more of the following values:
   a) maximum drive power consumption (MPCi) by the electric motor during the forward movement (Mi);
   b) energy draw time (MDi) by the electric motor above the maximum drive power consumption (MPCi);
   c) minimum drive power consumption (mPCi) by the electric motor in the forward movement (Mi);
   d) energy draw time (mDi) by the electric motor below the minimum drive power consumption (mPCi).

6. The device according to claim 1, in which the first threshold limit (LM1) for switching from the first continuous forward movement (M1) to the first alternating forward movement (M2) is given by at least one of the following conditions:
   a) the time (t1) elapsed between the sending of the control signal (S_drv) and the receipt of the incoming feedback signal (S_snrl) from the first sensor exceeds a predetermined value (MD); or
   b) the power drawn by the electric motor exceeds a predetermined maximum drive power consumption value (MPC1) by the electric motor for a time (t2) greater than the maximum time (MDi) the energy drawn by the electric motor is above (MPC1).

7. The device according to claim 1 in which, if one of the following conditions occurs during the second alternating forward movement (M3):
   the power drawn by the electric motor is less than the minimum drive power consumption (mPC31) by the electric motor for a time (t) greater than the energy draw time (mD3), the processing unit causes an endodontic instrument to perform the continuous forward movement (M1); or if
   the power drawn by the electric motor is less than the minimum drive power consumption (m PC32) by the electric motor for a time (t) greater than the energy draw time (mD3), the processing unit causes the endodontic instrument to perform the first reciprocating forward movement (M2).

8. The device according to claim 2, wherein the device is configured to activate automatically a warning sound when a predefined number (nI) of starts of conclusive movement (M4) is surpassed.

9. A device for controlling an electric motor for moving a tool, said device comprising:
   a first sensor that is designed to receive a signal (S_mtr) from said electric motor and to generate a signal (S_snr1) indicating first characteristic operating parameters (RS; RD; RP; PS) of the electric motor;
   a control unit that is in data communication with said electric motor and said first sensor, and the control unit comprising:
      a drive unit that is designed to power the electric motor by a power supply voltage (S_drv);
      a second sensor that is designed to generate a feedback signal (S_snr2) that is proportional to a second operating parameter of the electric motor, and said second sensor being in data communication with the drive unit;
      a processing unit in data communication with said drive unit, said first sensor and said second sensor, said processing unit being designed to cause an endodontic instrument to perform a sequence of forward movements (M1, M2) by acting on said electric motor as a function of the first signal (S_snr1) received from the first sensor and the second signal (S_snr2) received from the second sensor, and the sequence of movements (M1, M2) comprising:
         a start with a continuous forward movement (M1) in which the electric motor is driven in rotation with a first supplied power (PS1), a first rotational speed (RS1) and a first direction of rotation (RD1);
         when a first threshold limit (LM1) is surpassed, the start of a first alternating movement (M2) in which the electric motor is driven in rotation with a second supplied power value (PS2), a second rotational speed (RS2), a first clockwise angle of rotation (CWA2), a first anti-clockwise angle of rotation (CCWA2) and a second pause (RP2), between said first clockwise angle of rotation (CWA2) and said first anti-clockwise angle of rotation (CCWA2).

10. The device according to claim 9, wherein said processing unit is designed to cause the endodontic instrument to perform a sequence of forward movements (M1, M2, M3), wherein, when a second threshold limit (LM2) is surpassed, a second alternating movement (M3) is started in which the electric motor is driven in rotation with a third supplied power value (PS3), a third rotational speed (RS3), a third clockwise angle of rotation (CWA3), a third anti-clockwise angle of rotation (CCWA3) and a third pause (RP3) between said third clockwise angle of rotation (CWA3) and said third anti-clockwise angle of rotation (CCWA3).

11. The device according to claim 10 in which, when the third threshold limit (LM3) is surpassed during the second alternating movement (M3), a fourth reverse movement (M4) starts, in which the electric motor is driven to withdraw the endodontic instrument from a canal.

12. The device according to claim 9, in which said second sensor (6) is a current sensor designed to generate a feedback signal (S_snr2) proportional to a current drawn by the electric motor (9) and to send said signal to the processing unit (3).

13. A device for controlling an electric motor for moving a tool, said device being configured to, when used as intended, cause the tool to move in a sequence of movements (M1, M2 or M3) as a function of the signals received from a sensor, the sequence of movements (M1, M2 or M3) comprising:

an initial movement (M1) in which the electric motor is driven in a normal rotational direction and the tool moves in a forward rotational direction with a high torque intensity, the initial movement being maintained until a first maximum threshold limit (LM1) is surpassed; wherein when the first maximum threshold limit (LM1) is surpassed, the device is configured to switch from the initial movement (M1) to a first reciprocating movement (M2) in which the electric motor is repeatedly driven, in sequence, in the normal rotational direction and then a reverse rotational direction and such that the tool being moved with the first reciprocating movement at a lower torque intensity than when moved with the initial movement (M1), and the first reciprocating movement being maintained until a first minimum threshold (Lm1) is fallen below; wherein when the first minimum threshold (Lm1) is fallen below, the device is configured to switch from the first reciprocating movement (M2) back to the initial movement (M1) and to observe conditions for maintaining the initial movement (M1) or switching to the first reciprocating movement (M2);

wherein the device is configured to, when used as intended, cause the tool to move with a second reciprocating movement (M3) in which the electric motor is repeatedly driven, in sequence, in the normal rotational direction and then the reverse rotational direction and such that the tool is moved with the second reciprocating movement (M3) at a lower torque intensity than when moved with the first reciprocating movement (M2), and wherein the switch from the first reciprocating movement (M2) to the second reciprocating movement (M3) is triggered when, during performance of the first reciprocating movement (M2), a second maximum threshold (LM2) is surpassed; and wherein, in the second reciprocating movement (M3) the device is configured to switch back to one of the initial movement and the first reciprocating movement when the second minimum threshold (Lm2) or a third minimum threshold (Lm3) is fallen below; and wherein, when performing either one the initial movement or the first reciprocating movement, the conditions for either maintaining the one of the initial movement or the first reciprocating movement or for switching to the other of the initial movement or the first reciprocating movement are observed.

* * * * *